(12) United States Patent
Okamoto et al.

(10) Patent No.: US 7,390,868 B2
(45) Date of Patent: Jun. 24, 2008

(54) CATALYST FOR POLYCARBONATE PRODUCTION AND PROCESS FOR PRODUCING POLYCARBONATE

(75) Inventors: Masaya Okamoto, Ibaraki (JP); Jun-ichi Sugiyama, Ibaraki (JP); Mitsuru Ueda, Tokyo (JP)

(73) Assignees: National Institute of Advanced Industrial Science and Technology, Tokyo (JP); Idemitsu Kosan Co., Ltd., Tokyo (JP)

( * ) Notice: Subject to any disclaimer, the term of this patent is extended or adjusted under 35 U.S.C. 154(b) by 155 days.

(21) Appl. No.: 10/556,797

(22) PCT Filed: May 26, 2004

(86) PCT No.: PCT/JP2004/007573

§ 371 (c)(1),
(2), (4) Date: Nov. 15, 2005

(87) PCT Pub. No.: WO2004/106406

PCT Pub. Date: Dec. 9, 2004

(65) Prior Publication Data

US 2007/0043199 A1    Feb. 22, 2007

(30) Foreign Application Priority Data

May 29, 2003 (JP) .............................. 2003-152783
Aug. 8, 2003 (JP) ............................ 2003-290326
Nov. 28, 2003 (JP) ............................ 2003-398743

(51) Int. Cl.
*C08G 64/00* (2006.01)

(52) U.S. Cl. ........................ 528/198; 502/162; 502/164; 502/167; 502/208; 502/213; 528/196

(58) Field of Classification Search .................. 502/162, 502/164, 167, 208, 213; 528/196, 198
See application file for complete search history.

(56) References Cited

U.S. PATENT DOCUMENTS

| 3,855,307 | A | * | 12/1974 | Rony et al. | .................. 568/454 |
| 4,667,053 | A |   | 5/1987  | Lin | |
| 5,281,359 | A |   | 1/1994  | Scates et al. | |
| 5,466,874 | A | * | 11/1995 | Scates et al. | ................. 562/519 |
| 5,543,547 | A | * | 8/1996  | Iwane et al. | ................. 558/274 |
| 5,670,580 | A | * | 9/1997  | Tazaki et al. | ................. 525/240 |
| 6,534,670 | B2| * | 3/2003  | Yoshisato | ................... 558/274 |

FOREIGN PATENT DOCUMENTS

| CN | 1086741 A | 5/1994 |
| JP | 2002-297148 | 10/2000 |
| WO | 03/087030 | 10/2003 |

* cited by examiner

*Primary Examiner*—Terressa M Boykin
(74) *Attorney, Agent, or Firm*—Oblon, Spivak, McClelland, Maier & Neustadt, P.C.

(57) ABSTRACT

Provided are a catalyst for producing polycarbonate comprising a reaction product obtained by reacting (a) a catalyst carrier containing nitrogen or phosphorus with (b) a palladium compound and (c) a metal compound having a redox catalytic ability and a production process for polycarbonate, comprising a first step in which an aromatic dihydroxy compound and monovalent phenol are reacted with carbon monoxide and oxygen to produce a polycarbonate prepolymer and a second step in which the above polycarbonate prepolymer is subjected to solid state polymerization to produce polycarbonate, wherein the above catalyst is used in the first step described above. The catalyst of the present invention is readily separated from polycarbonate and can repeatedly be used, and the above catalyst makes it possible to efficiently produce polycarbonate of a high quality without using harmful chlorine gas and phosgene and halogenated organic solvents such as dichloromethane and chloroform which are considered to exert an adverse effect on the environment.

15 Claims, No Drawings

CATALYST FOR POLYCARBONATE PRODUCTION AND PROCESS FOR PRODUCING POLYCARBONATE

BACKGROUND OF THE INVENTION

The present invention relates to a catalyst for producing polycarbonate and a production process for polycarbonate, specifically to a catalyst for efficiently producing high quality polycarbonate which is useful as a resin material in the electric and electronic field, the automobile field, the optical part field and the structural material field while paying attentions to the environment and a production process for the polycarbonate.

RELATED ART

In general, a process (solution process) in which aromatic dihydroxy compounds such as bisphenol A are reacted with phosgene in the presence of alkali is known as a production process for polycarbonate. This process involves the problems that virulently poisonous phosgene is used and that a stoichiometric amount of alkali salts is by-produced.

Further, known as well is a process (melt process) in which carbonic acid diester such as diphenyl carbonate is used as a carbonyl source and in which it is molten by heating and reacted. In this melt process, heating is required for producing and melting carbonic acid diester, and the problem that polycarbonate obtained is colored because of heating at high temperature is involved therein.

A process by oxidative carbonylation reaction using a palladium/redox agent/halogenated onium salt catalyst is proposed as a new production process for polycarbonate (Japanese Patent Application Laid-Open No. 68744/1978). However, the reaction rate is unsatisfactory, and only polycarbonate having a low polymerization degree is obtained.

In order to solve the above problems, available is a process in which oxidative carbonylation reaction is carried out in a catalyst system of a palladium compound/inorganic redox catalyst/organic redox catalyst/halogenated onium compound/dehydrating agent to produce a polycarbonate oligomer and in which polycarbonate is then obtained by transesterification reaction (Japanese Patent Application Laid-Open No. 297148/2000).

However, the above process requires reaction steps of two stages, though polycarbonate having a high polymerization degree is obtained. Further, a palladium compound is dissolved in a solvent (homogeneous catalyst), and therefore it is likely to form a cluster of palladium (0) to deactivate the catalyst. Also, it is difficult to separate the catalyst, and the metal component is liable to remain in polycarbonate.

DISCLOSURE OF THE INVENTION

An object of the present invention is to solve the problems described above in a production process for polycarbonate and provide a catalyst for producing polycarbonate which is readily separated from polycarbonate and which can repeatedly be used. In addition thereto, it is to efficiently produce polycarbonate of a high quality using the above catalyst without using harmful chlorine gas and phosgene and halogenated organic solvents such as dichloromethane and chloroform which are considered to exert an adverse effect on the environment.

Intensive researches repeated by the present inventors have resulted in finding that a catalyst obtained by reacting a catalyst carrier containing nitrogen or phosphorus and a palladium compound with a metal compound having a redox catalytic ability is readily separated from polycarbonate and can repeatedly be used and that use of the above catalyst makes it possible to efficiently produce high quality polycarbonate while paying attentions to the environment. Thus, they have reached the present invention.

That is, the present invention provides a catalyst for producing polycarbonate and a production process for polycarbonate each described below.

(1) A catalyst for producing polycarbonate comprising a reaction product obtained by reacting (a) a catalyst carrier containing nitrogen or phosphorus with (b) a palladium compound and (c) a metal compound having a redox catalytic ability.

(2) The catalyst for producing polycarbonate as described in the item (1), wherein the catalyst carrier containing nitrogen or phosphorus is a vinylpyridine polymer represented by Formula (I):

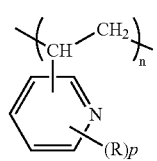

wherein R is an alkyl group having 1 to 20 carbon atoms, an alkoxy group having 1 to 20 carbon atoms, an aryl group having 6 to 20 carbon atoms or an arylalkyl group having 7 to 20 carbon atoms; p is 0 to 4; and n is 5 to 10000.

(3) The catalyst for producing polycarbonate as described in the item (1), wherein the catalyst carrier (a) containing nitrogen or phosphorus is a catalyst carrier selected from polyvinylpyrrolidone and diphenylphosphino-polystyrene.

(4) The catalyst for producing polycarbonate as described in the item (1), wherein the catalyst carrier (a) containing nitrogen or phosphorus is a compound obtained by partially quaternizing nitrogen or phosphorus contained in an organic carrier or an inorganic carrier with alkyl halide.

(5) The catalyst for producing polycarbonate as described in the item (4), wherein the organic carrier in (a) is at least one selected from diphenylphosphino-polystyrene, poly-4-vinylpyridine or poly-2-vinylpyridine.

(6) The catalyst for producing polycarbonate as described in any of the items (1) to (3), further comprising (d) an onium salt.

(7) The catalyst for producing polycarbonate as described in any of the items (1) to (6), further comprising (e) an organic redox agent.

(8) The catalyst for producing polycarbonate as described in any of the items (1) to (7), further comprising (f) a dehydrating agent.

(9) The catalyst for producing polycarbonate as described in any of the items (1) to (8), wherein the metal compound (c) having a redox catalytic ability is a cobalt compound.

(10) A production process for polycarbonate, comprising a first step in which an aromatic dihydroxy compound and monovalent phenol are reacted with carbon monoxide and oxygen to produce a polycarbonate prepolymer and a second step in which the above polycarbonate prepolymer is subjected to solid state polymerization to produce polycarbonate, wherein the catalyst for producing polycarbonate as described in any of the items (1) to (9) is used in the first step described above.

BEST MODE FOR CARRYING OUT THE INVENTION

The present invention shall be explained below in further details.

First, the catalyst of the present invention for producing polycarbonate is a catalyst for producing polycarbonate comprising a reaction product obtained by reacting (a) a catalyst carrier containing nitrogen or phosphorus with (b) a palladium compound and (c) a metal compound having a redox catalytic ability, and it further comprises, if necessary, (d) an onium salt, (e) an organic redox agent and (f) a dehydrating agent.

The respective catalyst components shall be explained below.

The specific examples of the catalyst carrier containing nitrogen or phosphorus for fixing palladium and metal having a redox catalytic ability in the catalyst for producing polycarbonate include (a-1) a vinylpyridine polymer, (a-2) a catalyst carrier selected from polyvinylpyrrolidone and diphenylphosphino-polystyrene and (a-3) a compound obtained by partially quaternizing nitrogen or phosphorus contained in an organic carrier or an inorganic carrier with alkyl halide.

(a-1) Vinylpyridine Polymer

The vinylpyridine polymer is a polymer represented by the following Formula (I):

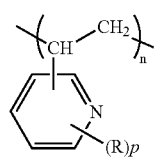

(I)

wherein R is an alkyl group having 1 to 20 carbon atoms, an alkoxy group having 1 to 20 carbon atoms, an aryl group having 6 to 20 carbon atoms or an arylalkyl group having 7 to 20 carbon atoms; p is 0 to 4; and n is 5 to 10000.

The alkyl group having 1 to 20 carbon atoms and the alkoxy group having 1 to 20 carbon atoms in Formula (I) include, for example, methyl, ethyl, n-propyl, isopropyl, n-butyl, isobutyl, methoxy and ethoxy. The aryl group having 6 to 20 carbon atoms and the arylalkyl group (aralkyl group) having 7 to 20 carbon atoms include phenyl, naphthyl, tolyl, xylyl, mesityl and benzyl.

Polymers for fixing palladium and metal having a redox catalytic ability are obtained by subjecting 2-vinylpyridine, 3-vinylpyridine, 4-vinylpyridine and aromatic ring-substituted derivatives thereof to conventional radical polymerization, and capable of being used therefor are poly(2-vinylpyridine), poly(3-vinylpyridine), poly(4-vinylpyridine), poly(6-methyl-2-vinylpyridine), poly(5-methyl-2-vinylpyridine) and poly(5-ethyl-2-vinylpyridine). Among them, poly(4-vinylpyridine) is preferred. The above polymers may be either linear or cross-linked.

Fixing (complex forming) of palladium and metal having a redox catalytic ability is achieved by stirring at room temperature in a solvent in which a metal salt is dissolved. For example, a fixing catalyst (complex) is obtained by dissolving poly(4-vinylpyridine) in dichloromethane, adding a dichloromethane solution of dichlorobis(benzonitrile)palladium (II) thereto and then adding an acetone solution of cobalt (II) chloride thereto. The fixed structure is considered, though not confirmed, to assume a structure shown below:

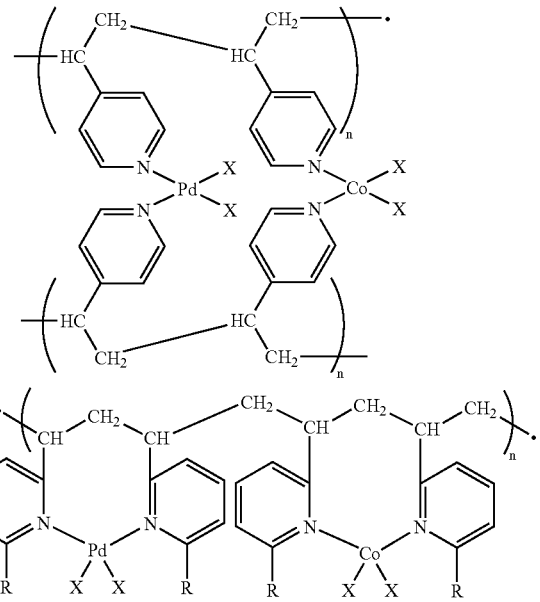

(a-2) The Catalyst Carrier Selected from Polyvinylpyrrolidone and Diphenylphosphino-Polystyrene Polyvinylpyrrolidone is represented by the following formula:

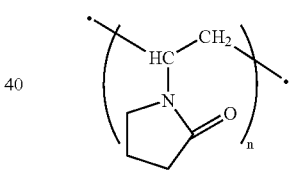

A molecular weight of the above polyvinylpyrrolidone shall not specifically be restricted, and it is usually 10,000 to 200,000. Polyvinylpyrrolidone may be either a linear type or a cross-linked type. The term n shows a polymerization degree and is a value which allows the molecular weight to fall in the range described above.

Diphenylphosphino-polystyrene is represented by the following formula:

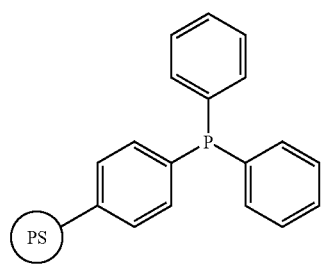

In the above formula, PS represents polystyrene.

As described above, diphenylphosphino-polystyrene assumes a structure in which triphenylphosphine is bonded to various polystyrene beads, and the polymer in which 1 to 5 millimole of a diphenylphosphino group per g of the catalyst carrier is bonded can be used. Products manufactured by Argonaut Co., Ltd. are available as commercial products. In general, polystyrene is cross-linked by copolymerization with divinylbenzene.

Palladium and metal having a redox catalytic v bability can be fixed, for example, by mixing a solution prepared by dissolving or suspending polyvinylpyrrolidone or diphenylphosphino-polystyrene in a suitable solvent with a solution dissolving a palladium compound usually at room temperature. When polyvinylpyrrolidone is sued as the catalyst carrier, a structure shown below is considered, though not confirmed, to be assumed:

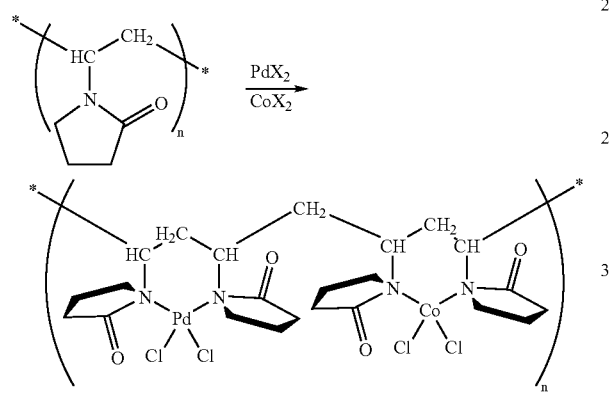

(a-3) Compound Obtained by Partially Quaternizing Nitrogen or Phosphorus Contained in an Organic Carrier or an Inorganic Carrier with Alkyl Halide.

The organic carrier in which nitrogen or phosphorus can be quaternized with alkyl halide includes diphenylphosphino-polystyrene, poly-4-vinylpyridine, poly-2-vinylpyridine, polyvinylpyrrolidone, bipyridino-polystyrene, N,N-(diisopropyl)aminomethylpolystyrene, N-(methylpolystyrene)-4-(methylamino)pyridine and N,N-diethanolaminomethylpolystyrene. The inorganic carrier includes diphenylphosphino-2-silica and pyridino-2-silica, and among them, diphenylphosphino-polystyrene is preferred.

Alkyl halide (R—X) used for quaternization shall not specifically be restricted, and R includes methyl, ethyl, n-propyl, isopropyl, n-butyl, isobutyl, sec-butyl, tert-butyl, n-pentyl, n-hexyl and benzyl. X includes bromine, chlorine and iodine. The alkyl halides may be used alone or in combination of two or more kinds thereof.

Quaternization reaction of the organic carrier or the inorganic carrier may be carried out by conventional methods, and it is carried out, for example, by heating the carrier and alkyl halide in a solvent. The solvent used in this case shall not specifically be restricted, and methanol, ethanol, DMF and THF are used. Methanol is preferred.

Reaction in the case of quaternizing diphenylphosphino-polystyrene with butyl bromide as the example of quaternization is represented by the following equation:

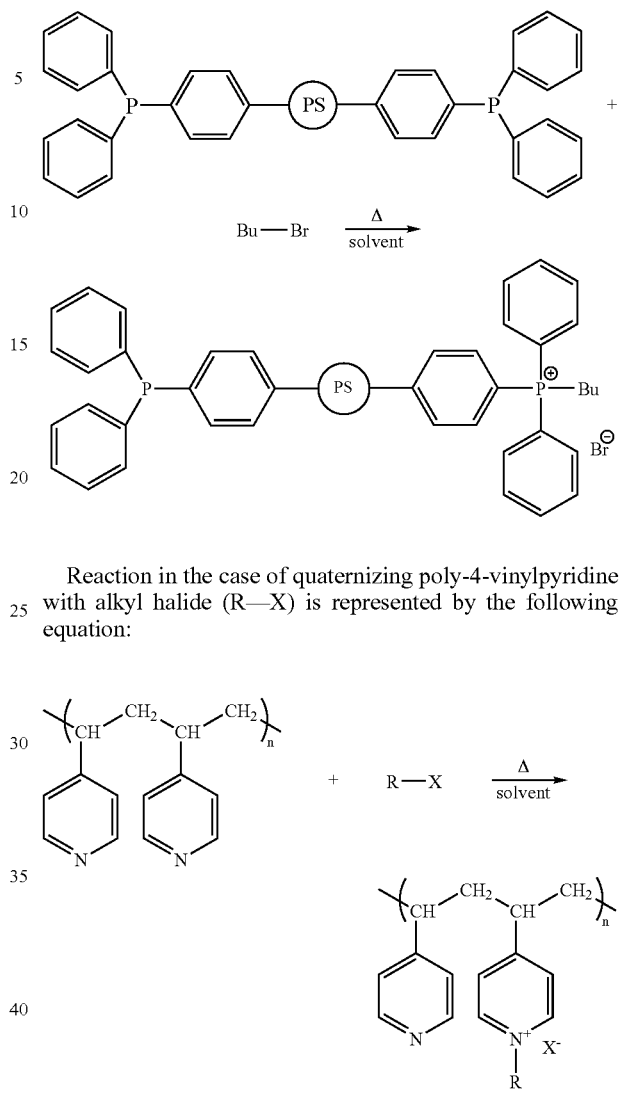

Reaction in the case of quaternizing poly-4-vinylpyridine with alkyl halide (R—X) is represented by the following equation:

Fixing of palladium and metal having a redox catalytic ability is carried out by stirring at room temperature in a solvent in which a metal salt is dissolved. A fixing catalyst is obtained, for example, by suspending partially quaternized diphenylphosphino-polystyrene (PS-TPP) in acetone, adding a dichloromethane solution of dichlorobis(benzonitrile)palladium (II) thereto to stir the solution at room temperature and adding an acetone solution of cobalt (II) chloride thereto after the color of palladium in the acetone solution disappears to stir the solution at room temperature.

When the compound obtained by partially quaternizing nitrogen or phosphorus contained in the organic carrier or the inorganic carrier with alkyl halide is used as the catalyst carrier as described above, it is used in combination with a dehydrating agent requiring no solvent without using an organic redox agent, whereby polycarbonate having no coloring can be obtained.

(b) Palladium Compound

Any compounds may be used as the component (b) as long as they contain a palladium atom. Used as the above palladium compound are, to be specific, ordinary palladium (II) chloride, palladium (II) bromide, palladium carbonyl chloride and palladium acetate and in addition thereto, dichlorobis(acetonitrile)palladium (II) and dichlorobis(benzonitrile)palladium (II). The above palladium compounds may be used alone or in combination of two or more kinds thereof.

(c) Metal Compound Having a Redox Catalytic Ability

Metal having a redox catalytic ability includes, lanthanoids, transition metals of the 5th to 7th groups in the periodic table, chromium, manganese, iron, cobalt, nickel and copper, and among them, cobalt is preferred. Cobalt (II) chloride and cobalt (II) acetate are suited as the cobalt compound. Among them, cobalt (II) chloride is preferred. A use amount thereof is 0.5 to 100 mole per mole of palladium. The above metals having a redox catalytic ability may be used alone or in combination of two or more kinds thereof.

Fixing of palladium and metal having a redox catalytic ability is carried out by the method described in the explanations of the respective catalyst carriers.

The above fixing catalysts may be used alone or in combination of two or more kinds thereof. Further, they may be use in combination with metal compounds carried on inorganic stratified compounds and palladium compounds which are not subjected fixing.

(d) Onium Salt

An onium salt which is considered to activate a hydroxy compound may be added, if necessary, to the catalyst of the present invention for producing polycarbonate (provided that excluded is a case where the compound of (a-3) obtained by partially quaternizing nitrogen or phosphorus contained in the organic carrier or the inorganic carrier with alkyl halide is used as the catalyst carrier).

The onium salt includes ammonium salts, oxonium salts, sulfonium salts, phosphonium salts and selenonium salts. Among them, ammonium salts and phosphonium salts are preferred. For example, tetra(n-butyl)ammonium bromide and bis(triphenylphosphoranilidene)ammonium bromide are used as the ammonium salts. Tetra(n-butyl)phosphonium bromide and tetraphenylphosphonium bromide are used as the phosphonium salts. A use amount of the onium salt may be about 0.1 mole % or more based on the hydroxy compound.

(e) Organic Redox Agent

The organic redox agent added if necessary includes hydroquinone, benzoquinone, α-naphthoquinone, anthraquinone, catechol, 2,2'-biphenol and 4,4'-biphenol. The above redox agents may be used alone or in combination of two or more kinds thereof. A use amount thereof is 0.5 to 100 mole per mole of palladium.

(f) Dehydrating Agent

Molecular sieves and zeolite are used as the dehydrating agent added if necessary, and it shall not specifically be restricted. Among them, molecular sieve of synthetic zeolite is preferred. A-3 and A-4 are preferred, and A-3 is more preferred.

(g) Promoter

In the catalyst of the present invention, a promoter can be added in a certain case for the purposes of enhancing a catalyst activity, a selectivity to the intended product, the yield and a life. Any compounds can be used for the promoter as long as they do not exert an adverse effect on the reaction, and heteropolyacids and onium salts of heteropolyacids are suitably used.

The heteropolyacids include phosphotungstic acid, phosphomolybdic acid, silicotungstic acid, silicomolybdic acid, phosphotungstomolybdic acid, silicotungstomolybdic acid and phosphovanadomolybdic acid. Further, onium salts, alkaline metal salts, alkaline earth metal salts and transition metal salts thereof can be used as well. They may be used alone or in combination of two or more kinds thereof.

Production Process for Polycarbonate

The production process of the present invention for polycarbonate comprises a first step in which an aromatic dihydroxy compound and monovalent phenol are reacted with carbon monoxide and oxygen to produce a polycarbonate prepolymer and a second step in which the above polycarbonate prepolymer is subjected to solid state polymerization to produce polycarbonate, and the catalyst described above is used in the first step described above.

In the production process of the present invention for polycarbonate, publicly known various compounds can be used as the aromatic dihydroxy compound of the raw material, and it can suitably be selected according to the kind of desired polycarbonate.

The aromatic dihydroxy compound includes an aromatic dihydroxy compound (divalent phenol) having 12 to 37 carbon atoms represented by Formula (II):

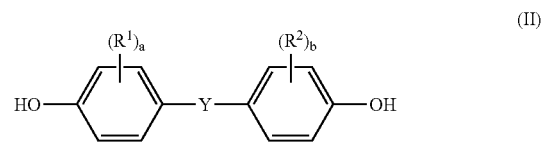

wherein $R^1$ and $R^2$ each are a halogen atom (for example, chlorine, bromine, fluorine and iodine), an alkoxy group, an ester group, a carboxyl group, a hydroxyl group, an alkyl group having 1 to 8 carbon atoms or an aromatic group which may have an alkyl group on a ring having 6 to 20 carbon atoms in total, and they may be bonded to either of an opposition and a m-position; when each plural $R^1$ and $R^2$ are present, respective $R^1$ and $R^2$ may be the same as or different from each other; a and b each are an integer of 0 to 4; and Y represents a single bond, an alkylene group having 1 to 8 carbon atoms, an alkylidene group having 2 to 8 carbon atoms, a cycloalkylene group having 5 to 15 carbon atoms, a cycloalkylidene group having 5 to 15 carbon atoms, —S—, —SO—, —SO$_2$—, —O—, —CO— bonds or a group represented by a formula:

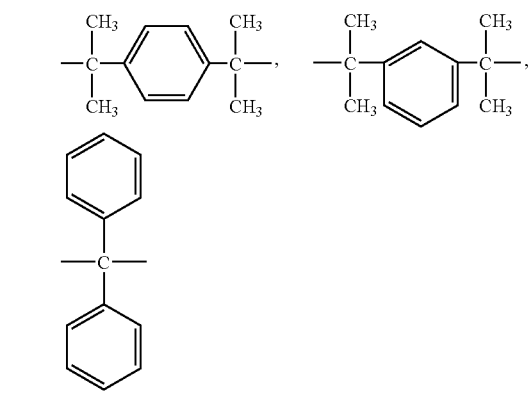

In this case, various compounds are available as the aromatic dihydroxy compound represented by Formula (II), and 2,2-bis(4-hydroxyphenyl)propane (bisphenol A) is particularly preferred. Divalent phenol other than bisphenol A includes bis(4-hydroxyphenyl) compounds other than bisphenol A, such as 1,1-bis(4-hydroxyphenyl)methane, 1,1-bis(4-hydroxyphenyl)ethane, 9,9-bis(4-hydroxyphenyl)fluorene, 9,9-bis(3-methyl-4-hydroxyphenyl)fluorene, bis(4-hydroxyphenyl)cycloalkane, bis(4-hydroxyphenyl) sulfide, bis(4-hydroxyphenyl) sulfone, bis(4-hydroxyphenyl)sulfoxide, bis(4-hydroxyphenyl) ether and bis(4-hydroxyphenyl) ketone or halogenated bisphenols such as 2,2-bis(3,5-dibromo-4-hydroxyphenyl)propane and 2,2-bis(3,5-dichloro-4-hydroxyphenyl)propane. When the above phenols have alkyl groups as substituents, the above alkyl groups are preferably alkyls group having 1 to 8 carbon atoms, particularly preferably alkyl groups having 1 to 4 carbon atoms. The above aromatic dihydroxy compounds may be used alone or in combination of two or more kinds thereof.

Monovalent phenol used in the first step shall not specifically be restricted and includes phenol, o-, m- or p-cresol, p-tert-butylphenol, p-tert-amylphenol, p-tert-octylphenol, p-cumylphenol, p-methoxyphenol and p-phenylphenol. Among them, p-tert-butylphenol and phenol are preferred. A use amount thereof falls in a range of usually 5 to 70 mole % based on the aromatic dihydroxy compound. The above monovalent phenols may be used alone or in combination of two or more kinds thereof.

Carbon monoxide reacted with the aromatic dihydroxy compound and monovalent phenol in the first step may be a single substance or may be diluted with inert gas or may be a mixed gas with hydrogen. Further, oxygen reacted as well in the first step may be pure oxygen or may be diluted with inert gas, for example, oxygen-containing gas such as air.

The solvent which can be used in producing the prepolymer in the first step shall not specifically be restricted and includes, for example, dichloromethane, 1,2-didichloroethane, chloroform, acetone, γ-butyrolactone, tetrahydrofuran and cyclohexane, and non-halogen solvents are preferred from the viewpoint of environmental problems. Solvents useful as the non-halogen solvents include compounds having a carbonate bond. They include, for example, dimethyl carbonate, diethyl carbonate, diphenyl carbonate, ethylene carbonate, propylene carbonate, diallyl carbonate, allyl methyl carbonate, bis(2-methoxyphenyl)carbonate, vinylene carbonate, dibenzyl carbonate, di(o-methoxyphenyl)carbonate and methyl ethyl carbonate. Among them, propylene carbonate is preferred. The above carbonate base solvents may be used alone or in combination of two or more kinds thereof.

Reaction temperature in producing the prepolymer by oxidative carbonylation reaction falls in a range of 30 to 180° C., preferably 50 to 150° C. and more preferably 80 to 120° C. If it exceeds 180° C., side reactions such as decomposition reaction are increased, and coloring is liable to be brought about. On the other hand, if it is lower than 30° C., the reaction velocity is reduced, and it is not practical.

In general, the reaction pressure is set to a pressurized state since gaseous materials such as carbon monoxide and oxygen are used. A partial pressure of carbon monoxide falls in a range of $1 \times 10^{-2}$ to 20 MPa, preferably $1 \times 10^{-2}$ to 10 MPa, and a partial pressure of oxygen falls in a range of $1 \times 10^{-2}$ to 10 MPa, preferably $1 \times 10^{-2}$ to 5 MPa. In particular, a partial pressure of oxygen is preferably controlled so that a gas composition in the reaction system deviates from a range of explosion. If the reaction pressure is too low, the reaction velocity is reduced, and if it is too high, the reaction apparatus is large-scaled and increased in a construction cost, so that it is economically disadvantageous. When using inert gas and hydrogen, they are advisably used, though the partial pressures thereof shall not specifically be restricted, suitably in a practical pressure range.

The reaction time is 1 to 48 hours, preferably 2 to 36 hours and more preferably 3 to 24 hours in the case of, for example, a batch system. If it is shorter than one hour, the yield is lowered, and if it exceeds 48 hours, the yield does not go up any more.

Any of a batch system, a semi-continuous system in which the raw materials, the catalyst and the like are continuously introduced and a continuous system in which the raw materials, the catalyst and the like are continuously introduced and in which the reaction product is continuously drawn out can be used for a reaction system in producing the prepolymer.

In the second step, the polycarbonate prepolymer produced in the first step is subjected to solid state polymerization to produce polycarbonate. In this case, a quaternary phosphonium salt is suitably used as the catalyst.

The quaternary phosphonium salt used for the solid state polymerization shall not specifically be restricted and includes various compounds, and a compound represented by, for example, the following Formula (III) or (IV) can be used:

In Formula (III) and (IV) described above, $R^3$ represents an organic group. This organic group represents a linear, branched or cyclic alkyl group having 1 to 20 carbon atoms which has or does not have a substituent, an aryl group having 6 to 20 carbon atoms which has or does not have a substituent or an aralkyl group having 7 to 20 carbon atoms which has or does not have a substituent.

In this case, the examples of the alkyl group having 1 to 20 carbon atoms include methyl, ethyl, n-propyl, isopropyl, n-butyl, isobutyl, sec-butyl, tert-butyl, n- or isopentyl, n- or isohexyl, n- or isooctyl, n- or isodecyl, n- or isododecyl, n- or isotetradecyl, cyclopentyl, cyclohexyl and methylcyclohexyl. Substituents for the above alkyl groups include, for example, a halogen atom, an alkoxy group, an arylalkoxy group and an acyloxy group.

The examples of the aryl group having 6 to 20 carbon atoms include phenyl, naphthyl and biphenyl. Substituents for the above alkyl groups include, for example, a halogen atom, an alkoxy group, an arylalkoxy group and an acyloxy group. The examples of the aralkyl group having 7 to 20 carbon atoms include benzyl, phenethyl, naphthylmethyl and 1,1,1-triphenylmethyl. Substituents for the above aralkyl groups include, for example, a halogen atom, an alkoxy group, an arylalkoxy group and an acyloxy group.

Four $R^3$'s described above may be the same as or different from each other, and two $R^3$'s may be combined to form a ring structure.

$X^2$ represents a group capable of forming a monovalent anion, such as a halogen atom, a hydroxyl group, an alkyloxy group, an aryloxy group, R'COO, $HCO_3$, $(R'O)_2P(=O)O$ or $BR''_4$. In this case, R' represents a hydrocarbon group such as an alkyl group and an aryl group, and two R'O may be the same as or different from each other. R" represents a hydrogen atom or a hydrocarbon group such as an alkyl group and an aryl group, and four R" may be the same as or different from each other. $Y^1$ represents a group capable of forming a divalent anion, such as $CO_3$.

The specific examples of $X^2$ described above include hydroxide, borohydride, tetraphenylborate, alkyltriphenylborate, formate, acetate, propionate, butyrate, fluoride, chloride and hydrocarbonate. The specific examples of $Y^1$ include carbonates.

The specific examples of the quaternary phosphonium salts represented by Formula (III) and (IV) described above include tetra(aryl or alkyl)phosphonium hydroxides such as tetraphenylphosphonium hydroxide, tetranaphthylphosphonium hydroxide, tetra(chlorophenyl)phosphonium hydroxide, tetra(biphenyl)phosphonium hydroxide, tetratolylphosphonium hydroxide, tetramethylphosphonium hydroxide, tetraethylphosphonium hydroxide, tetraisopropylphosphonium hydroxide, tetrabutylphosphonium hydroxide, tetrahexylphosphonium hydroxide and tetracyclohexylphosphonium hydroxide, mono(aryl or alkyl)triphenylphosphonium hydroxides such as methyltriphenylphosphonium hydroxide, ethyltriphenylphosphonium hydroxide, propyltriphenylphosphonium hydroxide, isopropyltriphenylphosphonium hydroxide, butyltriphenylphosphonium hydroxide, octyltriphenylphosphonium hydroxide, tetradecyltriphenylphosphonium hydroxide, cyclohexyltriphenylphosphonium hydroxide, benzyltriphenylphosphonium hydroxide, ethoxybenzyltriphenylphosphonium hydroxide, methoxymethyltriphenylphosphonium hydroxide, acetoxymethyltriphenylphosphonium hydroxide, phenacyltriphenylphosphonium hydroxide, chloromethyltriphenylphosphonium hydroxide, bromomethyltriphenylphosphonium hydroxide, biphenyltriphenylphosphonium hydroxide, naphthyltriphenylphosphonium hydroxide, chlorophenyltriphenylphosphonium hydroxide, phenoxyphenyltriphenylphosphonium hydroxide, methoxyphenyltriphenylphosphonium hydroxide, acetoxyphenyltriphenylphosphonium hydroxide and naphthylphenyltriphenylphosphonium hydroxide, mono(aryl)trialkylphosphonium hydroxides such as phenyltrimethylphosphonium hydroxide, biphenyltrimethylphosphonium hydroxide, phenyltrihexylphosphonium hydroxide and biphenyltrihexylphosphonium hydroxide, diaryldialkylphosphonium hydroxides such as dimethyldiphenylphosphonium hydroxide, diethyldiphenylphosphonium hydroxide and di(biphenyl)diphenylphosphonium hydroxide and mono(alkyl or aralkyl)trialkyl phosphonium hydroxides such as isopropyltrimethylphosphonium hydroxide, isopropyltriethylphosphonium hydroxide, isopropyltributylphosphonium hydroxide, cyclohexyltrimethylphosphonium hydroxide, cyclohexyltriethylphosphonium hydroxide, cyclohexyltributylphosphonium hydroxide, 1,1,1-triphenylmethyltrimethylphosphonium hydroxide, 1,1,1-triphenylmethyltriethylphosphonium hydroxide and 1,1,1-triphenylmethyltributylphosphonium hydroxide.

Further, they include tetra(alkyl or aryl)phosphonium tetraphenylborates such as tetramethylphosphonium tetraphenylborate, tetraethylphosphonium tetraphenylborate, tetraphenylphosphonium tetraphenylborate, tetranaphthylphosphonium tetraphenylborate, tetra(chlorophenyl)phosphonium tetraphenylborate, tetra(biphenyl)phosphonium tetraphenylborate and tetratolylphosphonium tetraphenylborate, mono(aryl or alkyl)triphenylphosphonium tetraphenylborates such as methyltriphenylphosphonium tetraphenylborate, ethyltriphenylphosphonium tetraphenylborate, propyltriphenylphosphonium tetraphenylborate, butyltriphenylphosphonium tetraphenylborate, octyltriphenylphosphonium tetraphenylborate, tetradecyltriphenylphosphonium tetraphenylborate, cyclopentyltriphenylphosphonium tetraphenylborate, cyclohexyltriphenylphosphonium tetraphenylborate, benzyltriphenylphosphonium tetraphenylborate, ethoxybenzyltriphenylphosphonium tetraphenylborate, methoxymethyltriphenylphosphonium tetraphenylborate, acetoxymethyltriphenylphosphonium tetraphenylborate, phenacyltriphenylphosphonium tetraphenylborate, chloromethyltriphenylphosphonium tetraphenylborate, bromomethyltriphenylphosphonium tetraphenylborate, biphenyltriphenylphosphonium tetraphenylborate, naphthyltriphenylphosphonium tetraphenylborate, chlorophenyltriphenylphosphonium tetraphenylborate, phenoxyphenyltriphenylphosphonium tetraphenylborate, acetoxyphenyltriphenylphosphonium tetraphenylborate and naphthylphenyltriphenylphosphonium tetraphenylborate, monoaryltrialkylphosphonium tetraphenylborates such as phenyltrimethylphosphonium tetraphenylborate, biphenyltrimethylphosphonium tetraphenylborate, phenyltrihexylphosphonium tetraphenylborate and biphenyltrihexylphosphonium tetraphenylborate and diaryldialkylphosphonium tetraphenylborates such as dimethyldiphenylphosphonium tetraphenylborate, diethyldiphenylphosphonium tetraphenylborate and di(biphenyl)diphenylphosphonium tetraphenylborate.

Further, pair anions as alternatives for the hydroxides and the tetraphenylborates each described above include alkyltriphenylborates, an aryloxy group such as phenoxy, an alkyloxy group such as methoxide and ethoxide, an alkylcarbonyloxy group such as formate, acetate, propionate and butyrate, an arylcarbonyloxy group such as benzoate and the quaternary phosphonium salts described above using halogen atoms such as chloride and bromide.

In addition to the compounds represented by Formula (III) described above, capable of being given are compounds having a divalent pair anion represented by Formula (IV), for example, quaternary phosphonium salts such as bis(tetraphenylphosphonium) carbonate and bis(biphenyltriphenylphosphonium) carbonate, bis-tetraphenylphosphonium salts of 2,2-bis(4-hydroxyphenyl)propane, ethylenebis(triphenylphosphonium)dibromide and trimethylenebis(triphenylphosphonium)-bis(tetraphenylborate).

Among the above quaternary phosphonium salts, the phosphonium salts having an alkyl group, to be specific, tetramethylphosphonium methyltriphenylborate, tetraethylphosphonium ethyltriphenylborate, tetrapropylphosphonium propyltriphenylborate, tetrabutylphosphonium butyltriphenylborate, tetrabutylphosphonium tetraphenylborate, tetraethylphosphonium tetraphenylborate, trimethylethylphosphonium trimethylphenylborate and trimethylbenzylphosphonium benzyltriphenylborate are suited from the viewpoints that they have a high catalytic activity and that they are readily susceptible to thermal decomposition and less liable to remain in the polymer.

Tetraalkylphosphonium salts such as tetramethylphosphonium hydroxide, tetraethylphosphonium hydroxide and tetrabutylphosphonium hydroxide have a relatively low decomposition temperature, and therefore they are readily decomposed and less likely to remain in the product polycarbonate in the form of impurities. Further, they are preferred from the viewpoints that the unit requirement can be reduced because of smaller carbon atoms and that they are advantageous in terms of a cost.

Also, tetraphenylphosphonium tetraphenylborate is preferably used from the viewpoint of a balance between the catalyst effect and the quality of polycarbonate obtained.

Further, cyclohexyltriphenylphosphonium tetraphenylborate and cyclopentyltriphenylphosphonium tetraphenylborate can preferably be used from the viewpoint that a balance between the catalyst effect and the quality of polycarbonate obtained is excellent.

Preferably the quaternary phosphonium salt and, if necessary, other catalysts are used as a reaction catalyst in this solid state polymerization, and the catalyst remaining after added in the prepolymer forming step may be used as it is or the catalyst described above may be added again in the form of powder, liquid or gas. The reaction temperature Tp (° C.) and the reaction time in carrying out this solid state polymerization are varied according to the kind (chemical structure, molecular weight and the like) and the form of the crystallized prepolymer, the presence, the kind and the amount of the catalyst contained in the crystallized prepolymer, the kind or the amount of the catalyst added if necessary, the degree of crystallization of the crystallized prepolymer and a difference in a melting temperature Tm' (° C.) thereof, a required polymerization degree of the intended aromatic polycarbonate and other reaction conditions. The solid state polymerization reaction is carried out by heating preferably at not lower than a glass transition temperature of the intended aromatic polycarbonate and a temperature falling in a range in which the crystallized prepolymer during the solid state polymerization maintains a solid state without melting, more preferably at a temperature falling in a range represented by the following Formula (V):

$$Tm'-50 \leq Tp < Tm' \qquad (V)$$

for one minute to 100 hours, preferably 0.1 to 50 hours.

The above temperature range is preferably about 150 to 260° C., particularly preferably about 180 to 245° C. in the case of producing, for example, polycarbonate of bisphenol A. Also, preferably used in the polymerization step is a method in which the polymer during polymerization is heated as evenly as possible and in which the polymer is stirred, the reactor itself is rotated or the polymer is allowed to flow by heated gas in order to advantageously draw out by-products.

In general, a weight average molecular weight of industrially useful polycarbonate is 6,000 to 200,000, and polycarbonate having such polymerization degree is readily obtained by carrying out the solid state polymerization step described above. A crystallinity of the aromatic polycarbonate obtained by the solid state polymerization of the crystallized prepolymer grows larger than a crystallinity of the prepolymer before polymerization, and therefore a crystallized aromatic polycarbonate powder is obtained in the process of the present invention. The crystallized aromatic polycarbonate powder can be introduced directly into an extruding machine without cooling and pelletized or it can be introduced directly into a molding machine without cooling and molded. A proportion of pre-polymerization to solid state polymerization which contribute to polymerization may suitably be changed if necessary.

A polymerization method in a swollen solid state is a method in which the prepolymer crystallized by the method described above is further polymerized by solid state polymerization in a state in which it is swollen by swelling gas described later. This method utilizes that when removing low molecular compounds such as by-produced phenol by deaeration or extraction in a process for producing polycarbonate by transesterification reaction, the mass transfer rate becomes faster in the case of removing the low molecular compounds from the polymer (oligocarbonate) staying in a state swollen by swelling gas by deaeration or extraction than in the case of removing them from a high viscosity molten polymer and a crystallized solid matter by deaeration or extraction, so that the reaction can be carried out at a high efficiency.

A swelling solvent used in this case includes single swelling solvents which can swell polycarbonate on reaction conditions shown below, mixtures of the single swelling solvents and solvents obtained by mixing the single swelling solvents or the mixtures thereof with a single kind or plural kinds of poor solvents for polycarbonate.

The swelling state in the present step means a state that a prepolymer flake which is a raw material grows larger in terms of a volume or a weight than a heat swelling value in the range of reaction conditions shown below, and the swelling solvent means a compound which is a single compound having a boiling point at which it is completely vaporized in the range of the reaction conditions described below or having usually a vapor pressure of 6.7 kPa or more or a mixture thereof and which can form the swelling state described above.

Such swelling solvent shall not specifically be restricted as long as it satisfies the swelling conditions described above. For example, aromatic compounds and oxygen-containing compounds having a solubility parameter falling in a range of 4 to 40 $(cal/cm^3)^{1/2}$, preferably 7 to 14 $(cal/cm^3)^{1/2}$ correspond thereto. The swelling solvent includes, for example, aromatic hydrocarbons such as benzene, toluene, xylene, ethylbenzene, diethylbenzene, propylbenzene and dipropylbenzene; ethers such as tetrahydrofuran and dioxane; and ketones such as methyl ethyl ketone and methyl isobutyl ketone. Among them, a single compound of hydrocarbons having 6 to 20 carbon atoms or a mixture thereof is preferred.

In respect to the conditions of the poor solvent mixed with the swelling solvent, preferred are linear or branched saturated hydrocarbon compounds having 4 to 18 carbon atoms in which a solubility of polycarbonate in the solvent on the following reaction conditions is 0.1% by weight or less and which are less likely to take part in the reaction or hydrocarbon compounds which have 4 to 18 carbon atoms and which are unsaturated to a low degree. If both of the boiling points of the swelling solvent and the poor solvent exceed 250° C., it is difficult to remove the remaining solvents, and the quality is likely to be reduced, so that it is not preferred.

When using such poor solvent and swelling solvent in a mixture, 1% by weight or more of the swelling solvent is advisably contained in the mixed solvent, and preferably 5% by weight or more of the swelling solvent is allowed to be present in the mixed solvent. In this swelling solid state polymerization step, the reaction temperature is preferably 100 to 240° C., and the pressure in the reaction is preferably 1330 Pa to 0.5 MPa·G, particularly preferably atmospheric pressure. If the reaction temperature is lower than the range described above, the transesterification reaction does not proceed. If the reaction temperature is a high temperature condition exceeding a melting point of the prepolymer, the solid state can not be maintained to bring about the phenomenon of fusion between the particles, and the operability is notably reduced. Accordingly, the reaction temperature has to be the melting point or lower.

The swelling solvent gas may be fed by feeding it in a liquid state to a reactor to vaporize it in the reactor or may be fed to the reactor after vaporized in advance by means of a heat exchanger. In respect to a gas feeding amount, the gas of 0.5 liter (standard condition)/hr or more per g of the prepolymer is preferably fed to the reactor. A flow amount of the swelling solvent gas is closely related to the reaction rate, and it has an action as a heat carrier as well as a phenol removing effect, so that the reaction rate goes up as a flow amount of the gas is increased. The reactor used for such swelling solid state polymerization shall not specifically be restricted.

The catalyst of the present invention for producing polycarbonate is obtained by fixing the palladium compound and the metal compound having a redox catalytic ability with the catalyst carrier described above, and after finishing the reaction, it can readily be separated together with the dehydrating agent by filtration, dried and reproduced. An amount of metal remaining in the polycarbonate obtained is very small.

In the production process of the present invention for polycarbonate, polycarbonate having a large molecular weight is obtained according to the production steps of two stages described above, and therefore polycarbonate having a high quality can efficiently be produced.

The catalyst system of the present invention is useful for carbonylation of not only a dihydroxy compound but also a monohydroxy compound, and it can be applied as well to the synthesis of diphenyl carbonate.

The present invention shall be explained below in further details with reference to examples and comparative examples, but the present invention shall by no means be restricted by these examples. Reference examples show cases in which the recovered catalysts are reused.

In the following examples, comparative examples and reference examples, number average molecular weights (Mn) and weight average molecular weights (Mw) were measured by means of a GPC apparatus.

Effluent: chloroform
Column: Shodex K-804L
Calibration curve: polystyrene standard molecular weight: prepared with five samples of 1050, 5870, 17100, 98900 and 355000
Detector: ultraviolet ray (UV) detector The turnover number (TON) to palladium was calculated by dividing a mole number of bisphenol A by a mole number of palladium charged to obtain a value and multiplying the value by the yield.

EXAMPLE 1

(1) Production of Fixing Catalyst A

Poly(4-vinylpyridine) (molecular weight Mw: 100000, manufactured by Koei Chemical Ind. Co., Ltd.) 1.26 g was dissolved in 40 ml of dichloromethane, and a dichloromethane solution (dichlorobis(benzonitrile)palladium: 1.0 mmol, dichloromethane: 30 ml) of dichlorobis(benzonitrile) palladium (II) was slowly added thereto. Subsequently, an acetone solution (cobalt chloride (II): 5 mmol, acetone: 70 ml) of cobalt chloride (II) was added thereto and stirred at room temperature for 2 hours. Then, the precipitate was filtered, washed with acetone and dried under vacuum at 60° C. for 24 hours. The intended fixing catalyst A was obtained at a yield of 1.90 g.

(2) Confirmation of Catalyst Performance

An autoclave having a content volume of 30 ml was charged with 4.16 mmol of bisphenol A, 52.5 mg of the fixing catalyst A obtained in (1) described above, 0.625 mmol of tetrabutylammonium bromide, 0.125 mmol of benzoquinone, 1.0 g of synthetic zeolite A-3 powder (particle diameter: less than 75 μm, manufactured by Wako Pure Chemicals Industries, Ltd.) and 10 ml of propylene carbonate, and 6.0 MPa of carbon monoxide and 0.3 MPa of oxygen were filled thereinto at 25° C. After filled, the vessel was provided with a closed structure and heated at 100° C. for 24 hours. After finishing the reaction, the synthetic zeolite and the fixing catalyst were separated by filtration, and the intended polycarbonate prepolymer was obtained by reprecipitation from methanol. This was dried under vacuum at 100° C. for 24 hours. A yield and the molecular weights (Mn, Mw) of the polycarbonate prepolymer thus obtained are shown in Table 1. An amount of palladium remaining in the polycarbonate prepolymer obtained was 25 ppm (measuring limit) or less.

EXAMPLE 2

(1) Production of Fixing Catalyst B

The same procedure as in Example 1 (1) was carried out, except that in Example 1 (1), poly(2-vinylpyridine) (Mw: 18000, manufactured by Koei Chemical Ind. Co., Ltd.) was substituted for poly(4-vinylpyridine). The intended fixing catalyst B was obtained at a yield of 1.83 g.

(2) Confirmation of Catalyst Performance

The same procedure as in Example 1 (2) was carried out, except that in Example 1 (2), the fixing catalyst B obtained in (1) described above was substituted for the fixing catalyst A. A yield and the molecular weights (Mn, Mw) of the polycarbonate prepolymer thus obtained are shown in Table 1.

EXAMPLE 3

(1) Production of Fixing Catalyst C

The same procedure as in Example 1 (1) was carried out, except that in Example 1 (1), 1.43 g of poly(6-methyl-2-vinylpyridine) (Mw: 58000, manufactured by Koei Chemical Ind. Co., Ltd.) was substituted for 1.26 g of poly(4-vinylpyridine) 1.26 g. The intended fixing catalyst C was obtained at a yield of 2.12 g.

(2) Confirmation of Catalyst Performance

The same procedure as in Example 1 (2) was carried out, except that in Example 1 (2), 56.4 mg of the fixing catalyst C obtained in (1) described above was substituted for 52.5 mg of the fixing catalyst A. A yield and the molecular weights (Mn, Mw) of the polycarbonate prepolymer thus obtained are shown in Table 1.

REFERENCE EXAMPLE 1

The synthetic zeolite and the fixing catalyst which were separated in Example 1 (2) were dried under vacuum at 130° C. for 24 hours. An autoclave having a content volume of 30 ml was charged with 4.16 mmol of bisphenol A, the synthetic zeolite and the fixing catalyst (the whole amounts recovered) each dried, 0.625 mmol of tetrabutylammonium bromide, 0.125 mmol of benzoquinone and 10 ml of propylene carbonate, and 6.0 MPa of carbon monoxide and 0.3 MPa of oxygen were filled thereinto at 25° C. After filled, the vessel was provided with a closed structure and heated at 100° C. for 24 hours. After finishing the reaction, the synthetic zeolite and the fixing catalyst were separated, and a polycarbonate prepolymer was obtained again by reprecipitation from methanol. This was dried under vacuum at 100° C. for 24 hours. A yield and the molecular weights (Mn, Mw) of the polycarbonate prepolymer thus obtained are shown in Table 1.

TABLE 1

|  | Yield (%) | Number average molecular weight (Mn) | Weight average molecular weight (Mw) |
| --- | --- | --- | --- |
| Example 1 | 69 | 3370 | 5690 |
| Example 2 | 39 | 2560 | 3340 |
| Example 3 | 51 | 2790 | 4070 |
| Reference Example 1 | 45 | 2850 | 4920 |

EXAMPLE 4

First Step

An autoclave having a content volume of 100 ml was charged with 12.48 mmol of bisphenol A, 6.72 mmol of p-tert-butylphenol, 157.5 mg of the fixing catalyst A obtained in Example 1 (1), 1.875 mmol of tetrabutylammonium bromide, 0.375 mmol of benzoquinone, 3.0 g of the synthetic zeolite A-3 powder (particle diameter: less than 75 µm, manufactured by Wako Pure Chemicals Industries, Ltd.) and 30 ml of propylene carbonate, and 6.0 MPa of carbon monoxide and 0.3 MPa of oxygen were filled thereinto at 25° C. After filled, the vessel was provided with a closed structure and heated at 100° C. for 24 hours. After finishing the reaction, the synthetic zeolite and the fixing catalyst were separated by filtration, and the intended polycarbonate prepolymer was obtained by reprecipitation from methanol. It was dried under vacuum at 100° C. for 24 hours.

Second Step

Cyclohexyltriphenylphosphonium tetraphenylborate 300 ppm was added to 500 mg of the polycarbonate prepolymer obtained in the first step, and the mixture was put in an SUS tube having an inner diameter of 1.3 cm. Nitrogen gas was introduced thereinto at a rate of 100 ml/minute to carry out total 8 hours of solid state polymerization at 190° C. for 2 hours, 210° C. for 2 hours and 230° C. for 4 hours, whereby the intended polycarbonate was obtained. An amount of palladium remaining in the polycarbonate was 25 ppm or less.

The molecular weights (Mn, Mw) of the polycarbonate prepolymer obtained in the first step and the polycarbonate obtained in the second step are shown in Table 2.

COMPARATIVE EXAMPLE 1

The same procedure as in Example 4 was carried out, except that in Example 4, p-tert-butylphenol was not used. The molecular weights (Mn, Mw) of the polycarbonate prepolymer obtained in the first step and the polycarbonate obtained in the second step are shown in Table 2.

TABLE 2

| | First step prepolymer | | Second step polycarbonate | |
|---|---|---|---|---|
| | Mn | Mw | Mn | Mw |
| Example 4 | 2440 | 4040 | 11500 | 56000 |
| Comparative Example 1 | 3330 | 5680 | 3800 | 7030 |

EXAMPLE 5

(1) Production of Fixing Catalyst D

Polyvinylpyrrolidone (linear type, K=30, molecular weight Mw: 40000, manufactured by Tokyo Kasei Kogyo Co., Ltd.) 1.33 g was dissolved in 100 ml of dichloromethane, and a dichloromethane solution (dichlorobis(benzonitrile) palladium (II): 1.0 mmol, dichloromethane: 20 ml) of dichlorobis(benzonitrile)palladium (II) was slowly added thereto. Subsequently, an acetone solution (cobalt chloride (II): 5.0 mmol, acetone: 70 ml) of cobalt chloride (II) was added thereto and stirred at room temperature for 2 hours. Then, the precipitate was filtered, washed with acetone and dried under vacuum at 60° C. for 24 hours. The intended fixing catalyst D was obtained at a yield of 1.87 g.

(2) Confirmation of Catalyst Performance

An autoclave having a content volume of 30 ml was charged with 4.16 mmol of bisphenol A, 27.0 mg of the fixing catalyst D obtained in (1), 0.313 mmol of tetrabutylammonium bromide, 0.313 mmol of benzoquinone, 1.0 g of the synthetic zeolite A-3 powder (particle diameter: less than 75 µm, manufactured by Wako Pure Chemicals Industries, Ltd.) and 10 ml of propylene carbonate, and 6.0 MPa of carbon monoxide and 0.3 MPa of oxygen were filled thereinto at 25° C. After filled, the vessel was provided with a closed structure and heated at 100° C. for 24 hours. After finishing the reaction, the synthetic zeolite and the fixing catalyst were separated by filtration, and the intended polycarbonate was obtained by reprecipitation from methanol. This was dried under vacuum at 100° C. for 24 hours. A yield, the molecular weights (Mn, Mw) and a turnover number (TON) to palladium of the polycarbonate thus obtained are shown in Table 3.

EXAMPLE 6

(1) Production of Fixing Catalyst E

Polyvinylpyrrolidone (cross-linking type, manufactured by Tokyo Kasei Kogyo Co., Ltd.) 6.67 g was suspended in 50 ml of acetone, and an acetone solution (dichlorobis(benzonitrile)palladium (II): 1.0 mmol, acetone: 30 ml) of dichlorobis(benzonitrile)palladium (II) was added thereto and stirred at room temperature for 2 hours. Then, an acetone solution (cobalt chloride (II): 5 mmol, acetone: 70 ml) of cobalt chloride (II) was added thereto and stirred at room temperature for 17 hours. The resulting precipitate was filtered, washed with acetone and dried under vacuum at 60° C. for 24 hours. The intended fixing catalyst E was obtained at a yield of 7.28 g.

(2) Confirmation of Catalyst Performance

The same procedure as in Example 5 (2) was carried out, except that in Example 5 (2), 93.7 mg of the fixing catalyst E obtained in (1) described above was substituted for 27.0 mg of the fixing catalyst D.

A yield, the molecular weights (Mn, Mw) and a turnover number (TON) to palladium of the polycarbonate thus obtained are shown in Table 3.

EXAMPLE 7

An autoclave having a content volume of 100 ml was charged with 12.48 mmol of bisphenol A, 16.2 mg of the fixing catalyst D obtained in Example 5 (1), 0.938 mmol of tetrabutylammonium bromide, 0.188 mmol of benzoquinone, 3.0 g of the synthetic zeolite A-3 powder (particle diameter: less than 75 µm, manufactured by Wako Pure Chemicals Industries, Ltd.) and 30 ml of propylene carbonate, and 6.0 MPa of carbon monoxide and 0.3 MPa of oxygen were filled thereinto at 25° C. After filled, the vessel was provided with a closed structure and heated at 100° C. for 24 hours. After finishing the reaction, the synthetic zeolite and the fixing catalyst were separated by filtration, and the intended polycarbonate was obtained by reprecipitation from methanol. This was dried under vacuum at 100° C. for 24 hours. A yield, the molecular weights (Mn, Mw) and a turnover number (TON) to palladium of the polycarbonate thus obtained are shown in Table 3.

EXAMPLE 8

An autoclave having a content volume of 100 ml was charged with 12.48 mmol of bisphenol A, 45.0 mg of the fixing catalyst E obtained in Example 6 (1), 0.938 mmol of tetrabutylammonium bromide, 0.15 mmol of benzoquinone, 3.0 g of the synthetic zeolite A-3 powder (particle diameter: less than 75 μm, manufactured by Wako Pure Chemicals Industries, Ltd.) and 30 ml of propylene carbonate, and 6.0 MPa of carbon monoxide and 0.3 MPa of oxygen were filled thereinto at 25° C. After filled, the vessel was provided with a closed structure and heated at 100° C. for 24 hours. After finishing the reaction, the synthetic zeolite and the fixing catalyst were separated by filtration, and the intended polycarbonate was obtained by reprecipitation from methanol. This was dried under vacuum at 100° C. for 24 hours. A yield, the molecular weights (Mn, Mw) and a turnover number (TON) to palladium of the polycarbonate thus obtained are shown in Table 3.

TABLE 3

|  | Yield (%) | Mn | Mw | TON |
|---|---|---|---|---|
| Example 5 | 83 | 4180 | 7300 | 276 |
| Example 6 | 80 | 3870 | 6740 | 266 |
| Example 7 | 78 | 3680 | 6580 | 1290 |
| Example 8 | 70 | 3320 | 5510 | 1462 |

EXAMPLE 9

First Step

An autoclave having a content volume of 100 ml was charged with 11.47 mmol of bisphenol A, 2.024 mmol of p-tert-butylphenol, 81.0 mg of the fixing catalyst D obtained in Example 5 (1), 0.937 mmol of tetrabutylammonium bromide, 0.937 mmol of benzoquinone, 3.0 g of the synthetic zeolite A-3 powder (particle diameter: less than 75 μm, manufactured by Wako Pure Chemicals Industries, Ltd.) and 30 ml of propylene carbonate, and 6.0 MPa of carbon monoxide and 0.3 MPa of oxygen were filled thereinto at 25° C. After sealed, the vessel was provided with a closed structure and heated at 100° C. for 24 hours. After finishing the reaction, the synthetic zeolite and the fixing catalyst were separated by filtration, and the intended polycarbonate prepolymer was obtained by reprecipitation from methanol. It was dried under vacuum at 100° C. for 24 hours.

Second Step

Cyclohexyltriphenylphosphonium tetraphenylborate 300 ppm was added to 500 mg of the polycarbonate prepolymer obtained in the first step, and the mixture was put in an SUS tube having an inner diameter of 1.3 cm. Nitrogen gas was introduced thereinto at a rate of 100 ml/minute to carry out total 8 hours of solid state polymerization at 190° C. for 2 hours, 210° C. for 2 hours and 230° C. for 4 hours, whereby the intended polycarbonate was obtained. An amount of palladium remaining in the polycarbonate was 25 ppm (measuring limit) or less.

The molecular weights (Mn, Mw) of the polycarbonate prepolymer obtained in the first step and the polycarbonate obtained in the second step are shown in Table 4.

COMPARATIVE EXAMPLE 2

The same procedure as in Example 9 was carried out, except that in the first step of Example 9, p-tert-butylphenol was not used and that 12.48 mmol of bisphenol A was used.

The molecular weights (Mn, Mw) of the polycarbonate prepolymer obtained in the first step and the polycarbonate obtained in the second step are shown in Table 4.

TABLE 4

|  | First step prepolymer | | Second step polycarbonate | |
|---|---|---|---|---|
|  | Mn | Mw | Mn | Mw |
| Example 9 | 3000 | 4600 | 12900 | 50000 |
| Comparative Example 2 | 4070 | 7210 | 5000 | 8100 |

EXAMPLE 10

(1) Production of Fixing Catalyst F

Diphenylphosphino-polystyrene (PS-TPP, TPP: 1.5 mmol/g, lot No. 01740, manufactured by Argonaut Co., Ltd.) 3.97 g was suspended in 50 ml of acetone, and an acetone solution (dichlorobis(benzonitrile)palladium (II): 0.5 mmol, acetone: 20 ml) of dichlorobis(benzonitrile)palladium (II) was added thereto and stirred at room temperature for 4 hours. Subsequently, an acetone solution (cobalt chloride (II): 2.5 mmol, acetone: 35 ml) of cobalt chloride (II) was added thereto and stirred at room temperature for 24 hours. The precipitate was filtered, washed with acetone and methanol and dried under vacuum at 60° C. for 24 hours. The intended fixing catalyst F was obtained at a yield of 3.95 g.

(2) Confirmation of Catalyst Performance

An autoclave having a content volume of 30 ml was charged with 4.16 mmol of bisphenol A, 219 mg of the fixing catalyst F obtained in (1), 0.625 mmol of tetrabutylammonium bromide, 0.625 mmol of benzoquinone, 1.0 g of the synthetic zeolite A-3 powder (particle diameter: less than 75 μm, manufactured by Wako Pure Chemicals Industries, Ltd.) and 10 ml of propylene carbonate, and 6.0 MPa of carbon monoxide and 0.3 MPa of oxygen were filled thereinto at 25° C. After sealed, the vessel was provided with a closed structure and heated at 100° C. for 24 hours. After finishing the reaction, the synthetic zeolite and the fixing catalyst were separated by filtration, and the intended polycarbonate was obtained by reprecipitation from methanol. This was dried under vacuum at 100° C. for 24 hours. A yield, the molecular weights (Mn, Mw) and a turnover number (TON) to palladium of the polycarbonate thus obtained are shown in Table 5. An amount of palladium remaining in the polycarbonate was 25 ppm (measuring limit) or less.

EXAMPLE 11

The same procedure as in Example 10 was carried out, except that in Example 10, reduced were the fixing catalyst F to 110 mmol, tetrabutylammonium bromide to 0.313 mmol and benzoquinone to 0.313 mmol.

A yield, the molecular weights (Mn, Mw) and a turnover number (TON) to palladium of the polycarbonate thus obtained are shown in Table 5. An amount of palladium remaining in the polycarbonate was 25 ppm (measuring limit) or less.

EXAMPLE 12

The same procedure as in Example 10 was carried out, except that in Example 10, the fixing catalyst F was reduced to 43.9 mmol and that benzoquinone was reduced to 0.125 mmol.

A yield, the molecular weights (Mn, Mw) and a turnover number (TON) to palladium of the polycarbonate thus obtained are shown in Table 5. An amount of palladium remaining in the polycarbonate was 25 ppm (measuring limit) or less.

REFERENCE EXAMPLE 2

The synthetic zeolite and the fixing catalyst which were separated after finishing the reaction in Example 10 were dried under vacuum at 130° C. for 24 hours. An autoclave having a content volume of 30 ml was charged with 4.16 mmol of bisphenol A, the synthetic zeolite and the fixing catalyst (the whole amounts) each dried above, 0.625 mmol of tetrabutylammonium bromide, 0.625 mmol of benzoquinone and 10 ml of propylene carbonate, and 6.0 MPa of carbon monoxide and 0.3 MPa of oxygen were filled thereinto at 25° C. After filled, the vessel was provided with a closed structure and heated at 100° C. for 24 hours. After finishing the reaction, the synthetic zeolite and the fixing catalyst were separated by filtration, and the intended polycarbonate was obtained by reprecipitation from methanol. This was dried under vacuum at 100° C. for 24 hours. A yield, the molecular weights (Mn, Mw) and a turnover number (TON) to palladium of the polycarbonate thus obtained are shown in Table 5. An amount of palladium remaining in the polycarbonate was 25 ppm (measuring limit) or less.

TABLE 5

|  | Yield (%) | Mn | Mw | TON |
|---|---|---|---|---|
| Example 10 | 61 | 3160 | 5120 | 101 |
| Example 11 | 81 | 3990 | 7950 | 270 |
| Example 12 | 78 | 4030 | 8950 | 647 |
| Reference Example 2 | 59 | 3130 | 4980 | — |

EXAMPLE 13

First Step

An autoclave having a content volume of 100 ml was charged with 11.46 mmol of bisphenol A, 2.024 mmol of p-tert-butylphenol, 101.4 mg of the fixing catalyst F obtained in Example 10 (1), 0.938 mmol of tetrabutylammonium bromide, 0.938 mmol of benzoquinone, 3.0 g of the synthetic zeolite A-3 powder (particle diameter: less than 75 μm, manufactured by Wako Pure Chemicals Industries, Ltd.) and 30 ml of propylene carbonate, and 6.0 MPa of carbon monoxide and 0.3 MPa of oxygen were filled thereinto at 25° C. After filled, the vessel was provided with a closed structure and heated at 100° C. for 24 hours. After finishing the reaction, the synthetic zeolite and the fixing catalyst were separated by filtration, and the intended polycarbonate prepolymer was obtained by reprecipitation from methanol. It was dried under vacuum at 100° C. for 24 hours.

Second Step

Cyclohexyltriphenylphosphonium tetraphenylborate 300 ppm was added to 500 mg of the polycarbonate prepolymer obtained in the first step, and the mixture was put in an SUS tube having an inner diameter of 1.3 cm. Nitrogen gas was introduced thereinto at a rate of 100 ml/minute to carry out total 8 hours of solid state polymerization at 190° C. for 2 hours, 210° C. for 2 hours and 230° C. for 4 hours, whereby the intended polycarbonate was obtained. An amount of palladium remaining in the polycarbonate was 25 ppm (measuring limit) or less.

The molecular weights (Mn, Mw) of the polycarbonate prepolymer obtained in the first step and the polycarbonate obtained in the second step are shown in Table 6.

COMPARATIVE EXAMPLE 3

The same procedure as in Example 13 was carried out, except that in Example 13, p-tert-butylphenol was not used and that 12.48 mmol of bisphenol A was used.

The molecular weights (Mn, Mw) of the polycarbonate prepolymer obtained in the first step and the polycarbonate obtained in the second step are shown in Table 6.

TABLE 6

|  | First step prepolymer | | Second step polycarbonate | |
|---|---|---|---|---|
|  | Mn | Mw | Mn | Mw |
| Example 13 | 3280 | 5680 | 11900 | 56300 |
| Comparative Example 3 | 3530 | 5730 | 3900 | 7230 |

EXAMPLE 14

(1) Quaternization Reaction of Diphenylphosphino-Polystyrene

An autoclave having a content volume of 200 ml was charged with 5.00 g of diphenylphosphino-polystyrene (PS-TPP, TPP: 2.22 mmol/g, lot No. 02689, manufactured by Argonaut Co., Ltd.), 70 ml of methanol and 1.52 g of 1-boromobutane and purged with nitrogen, and it was heated to 100° C. and stirred for 48 hours. Then, it was cooled down to room temperature. The solid matter was filtered and washed with a large amount of butanol to remove unreacted 1-boromobutane, and it was dried under vacuum at 80° C. for 24 hours. The yield was 6.25 g. An increase in the amount shows that 82% of phosphine is quaternized.

(2) Production of Fixing Catalyst G

The 82%-quaternized diphenylphosphino-polystyrene 4.69 g obtained above was suspended in 60 ml of acetone, and an acetone solution (dichlorobis(benzonitrile)palladium (II): 0.5 mmol, acetone: 20 ml) of dichlorobis(benzonitrile)palladium (II) was added thereto and stirred at room temperature for one hour. Subsequently, an acetone solution (cobalt chloride (II): 1.0 mmol, acetone: 20 ml) of cobalt chloride (II) was added thereto and stirred at room temperature for 12 hours. Then, the precipitate was filtered, washed with acetone and dried under vacuum at 80° C. for 24 hours, and the intended fixing catalyst G was obtained.

(3) Confirmation of Catalyst Performance

An autoclave having a content volume of 30 ml was charged with 4.16 mmol of bisphenol A, 245 mg of the fixing catalyst G obtained in (1), 0.625 mmol of benzoquinone, 1.0 g of the synthetic zeolite A-3 powder (particle diameter: less than 75 μm, manufactured by Wako Pure Chemicals Industries, Ltd.) and 10 ml of propylene carbonate, and 6.0 MPa of carbon monoxide and 0.3 MPa of oxygen were filled thereinto at 25° C. After filled, the vessel was provided with a closed structure and heated at 100° C. for 24 hours. After finishing the reaction, the synthetic zeolite and the fixing catalyst were removed, and the intended polycarbonate was obtained by reprecipitation from methanol. This was dried under vacuum at 100° C. for 24 hours. The polycarbonate powder presented a pale yellow color by visual observation. A yield (%), a number average molecular weight (Mn) and a weight average molecular weight (Mw) of the polycarbonate thus obtained are shown in Table 7.

EXAMPLE 15

The same procedure as in Example 14 (3) was carried out, except that in Example 14 (3), benzoquinone was not added. The polycarbonate presented a white color by visual observation. An amount of palladium remaining in the polycarbonate was 25 ppm or less. A yield (%), a number average molecular weight (Mn) and a weight average molecular weight (Mw) of the polycarbonate thus obtained are shown in Table 7.

EXAMPLE 16

(1) Quaternization Reaction of Diphenylphosphino-Polystyrene

The same procedure as in Example 14 (1) was carried out, except that in Example 14 (1), a use amount of 1-boromobutane was changed to 1.29 g. The yield was 6.00 g. An increase in the amount shows that 66% of phosphine is quaternized.

(2) Production of Fixing Catalyst H

The 66%-quaternized diphenylphosphino-polystyrene 4.77 g obtained above was suspended in 60 ml of acetone, and an acetone solution (dichlorobis(benzonitrile)palladium (II): 2.5 mmol, acetone: 35 ml) of dichlorobis(benzonitrile)palladium (II) was added thereto and stirred at room temperature for one hour. Subsequently, an acetone solution (cobalt chloride (II): 1.0 mmol, acetone: 20 ml) of cobalt chloride (II) was added thereto and stirred at room temperature for 12 hours. Then, the precipitate was filtered, washed with acetone and dried under vacuum at 80° C. for 24 hours, and the intended fixing catalyst H was obtained.

(3) Confirmation of Catalyst Performance

The same procedure as in Example 14 (3) was carried out, except that in Example 14 (3), 258 mg of the fixing catalyst H obtained in (1) described above was substituted for 245 mg of the fixing catalyst G obtained in Example 14 (1). The polycarbonate powder presented a pale yellow color by visual observation. A yield (%), a number average molecular weight (Mn) and a weight average molecular weight (Mw) of the polycarbonate thus obtained are shown in Table 7.

EXAMPLE 17

The same procedure as in Example 16 (3) was carried out, except that in Example 16 (3), benzoquinone was not added. The polycarbonate powder presented a white color by visual observation. A yield (%), a number average molecular weight (Mn) and a weight average molecular weight (Mw) of the polycarbonate thus obtained are shown in Table 7.

REFERENCE EXAMPLE 3

The synthetic zeolite and the fixing catalyst G after used in Example 14 (3) were dried under vacuum at 130° C. for 24 hours. An autoclave having a content volume of 30 ml was charged with 4.16 mmol of bisphenol A, the synthetic zeolite and the fixing catalyst (the whole amounts recovered) each dried and 10 ml of propylene carbonate, and 6.0 MPa of carbon monoxide and 0.3 MPa of oxygen were filled thereinto at 25° C. After filled, the vessel was provided with a closed structure and heated at 100° C. for 24 hours. After finishing the reaction, the synthetic zeolite and the fixing catalyst were removed, and polycarbonate was obtained again by reprecipitation from methanol. This was dried under vacuum at 100° C. for 24 hours. The polycarbonate powder presented a white color by visual observation. A yield (%), a number average molecular weight (Mn) and a weight average molecular weight (Mw) of the polycarbonate thus obtained are shown in Table 7.

TABLE 7

|  | Yield (%) | Mn | Mw |
| --- | --- | --- | --- |
| Example 14 | 49 | 2300 | 3830 |
| Example 15 | 48 | 2200 | 3640 |
| Example 16 | 48 | 2450 | 3850 |
| Example 17 | 47 | 2400 | 3840 |
| Reference Example 3 | 35 | 1980 | 3450 |

EXAMPLE 18

First Step

An autoclave having a content volume of 100 ml was charged with 11.46 mmol of bisphenol A, 2.024 mmol of p-tert-butylphenol, 735 mg of the fixing catalyst G obtained in Example 14 (2), 3.0 g of the synthetic zeolite A-3 powder (particle diameter: less than 75 μm, manufactured by Wako Pure Chemicals Industries, Ltd.) and 30 ml of propylene carbonate, and 6.0 MPa of carbon monoxide and 0.3 MPa of oxygen were filled thereinto at 25° C. After filled, the vessel was provided with a closed structure and heated at 100° C. for 24 hours. After finishing the reaction, the synthetic zeolite and the fixing catalyst were removed, and the intended polycarbonate prepolymer was obtained by reprecipitation from methanol. It was dried under vacuum at 100° C. for 24 hours.

Second Step

Cyclohexyltriphenylphosphonium tetraphenylborate 300 ppm was added to 500 mg of the polycarbonate prepolymer obtained in the first step, and the mixture was put in an SUS tube having an inner diameter of 1.3 cm. Nitrogen gas was introduced thereinto at a rate of 100 ml/minute to carry out total 8 hours of solid state polymerization at 190° C. for 2 hours, 210° C. for 2 hours and 230° C. for 4 hours, whereby the intended polycarbonate was obtained. An amount of palladium remaining in the polycarbonate was 25 ppm or less.

The number average molecular weights (Mn) and the weight average molecular weights (Mw) of the polycarbonate prepolymer obtained in the first step and the polycarbonate obtained in the second step are shown in Table 8.

COMPARATIVE EXAMPLE 4

The same procedure as in Example 18 was carried out, except that in Example 18, p-tert-butylphenol was not used and that 12.48 mmol of bisphenol A was used. The number average molecular weights (Mn) and the weight average molecular weights (Mw) of the polycarbonate prepolymer obtained in the first step and the polycarbonate obtained in the second step are shown in Table 8.

TABLE 8

|  | First step prepolymer | | Second step polycarbonate | |
|---|---|---|---|---|
|  | Mn | Mw | Mn | Mw |
| Example 18 | 2200 | 3400 | 9500 | 29900 |
| Comparative Example 4 | 2300 | 3650 | 3700 | 6500 |

INDUSTRIAL APPLICABILITY

The catalyst of the present invention for producing polycarbonate is obtained by fixing a palladium compound and a metal compound having a redox catalytic ability with a specific polymer, and a cluster of palladium is not formed, so that polycarbonate can stably be produced.

The catalyst of the present invention for producing polycarbonate can readily be separated by filtration after finishing the reaction, and metal remaining in the polycarbonate after the above catalyst is separated is scarcely present.

Accordingly, the catalyst of the present invention for producing polycarbonate can repeatedly be used and keeps a high catalytic efficiency, so that polycarbonate can be produced at a high turnover number (TON).

Further, in the production process of the present invention for polycarbonate, polycarbonate having a large molecular weight and a high quality can efficiently be produced by the production steps of two stages described above without using harmful chlorine gas and phosgene and halogenated organic solvents such as dichloromethane and chloroform which are considered to exert an adverse effect on the environment.

The catalyst of the present invention for producing polycarbonate is useful for carbonylation of not only a dihydroxy compound but also a monohydroxy compound, and it can be applied as well to the synthesis of diphenyl carbonate.

What is claimed is:

1. A catalyst for producing polycarbonate comprising a reaction product obtained by reacting (a) a catalyst carrier selected from a vinylpyridine polymer represented by formula (I):

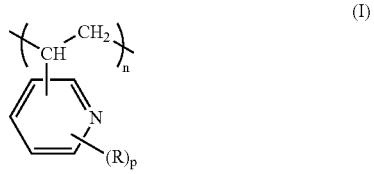

(I)

wherein R is an alkyl group having 1 to 20 carbon atoms, an alkoxy group having 1 to 20 carbon atoms, an aryl group having 6 to 20 carbon atoms or an arylalkyl group having 7 to 20 carbon atoms, p is 0 to 4, and n is 5 to 10000, polyvinylpyrrolidone and diphenylphosphino-polystyrene for fixing palladium and cobalt with (b) a palladium compound and (c) a cobalt compound, (d) an onium salt, (e) an organic redox agent and (f) a dehydrating agent.

2. A production process for polycarbonate, comprising a first step in which an aromatic dihydroxy compound and monovalent phenol are reacted with carbon monoxide and oxygen to produce a polycarbonate prepolymer and a second step in which the above polycarbonate prepolymer is subjected to solid state polymerization to produce polycarbonate, wherein a catalyst for producing polycarbonate comprising a reaction product obtained by reacting (a) catalyst carrier containing nitrogen or phosphorus for fixing palladium and metal having a redox catalytic ability with (b) a palladium compound and (c) a metal compound having a redox catalytic ability, (e) an organic redox agent and (f) a dehydrating agent is used in the first step.

3. The process of claim 2, wherein (a) the catalyst carrier containing nitrogen or phosphorus is a vinylpyridine polymer represented by formula (I):

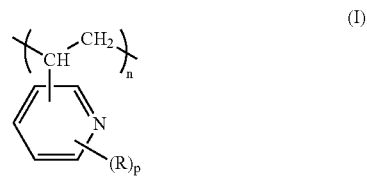

(I)

wherein R is an alkyl group having 1 to 20 carbon atoms, an alkoxy group having 1 to 20 carbon atoms, an aryl group having 6 to 20 carbon atoms or an arylalkyl group having 7 to 20 carbon atoms; p is 0 to 4; and n is 5 to 10000.

4. The process of claim 2, wherein (a) the catalyst carrier containing nitrogen or phosphorus is a catalyst carrier selected from polyvinylpyrrolidone and diphenylphosphino-polystyrene.

5. The process of claim 2, wherein (a) the catalyst carrier containing nitrogen or phosphorus for fixing palladium and metal having a redox catalytic ability is a compound obtained by partially quaternizing nitrogen or phosphorus contained in an organic carrier or an inorganic carrier with alkyl halide.

6. The process of claim 5, wherein in organic carrier in (a) is at least one selected from diphenylphosphino-polystyrene, poly-4-vinylpyridine or poly-2-vinylpyridine.

7. The process of claim 2, further comprising (d) an onium salt.

8. The process of claim 2, wherein (c) the metal compound having a redox catalytic ability is a cobalt compound.

9. The process of claim 3, wherein (c) the metal compound having a redox catalytic ability is a cobalt compound.

10. The process of claim 4, wherein (c) the metal compound having a redox catalytic ability is a cobalt compound.

11. The process of claim 5, wherein (c) the metal compound having a redox catalytic ability is a cobalt compound.

12. The process of claim 6, wherein (c) the metal compound having a redox catalytic ability is a cobalt compound.

13. The process of claim 7, wherein (c) the metal compound having a redox catalytic ability is a cobalt compound.

14. A process for producing for polycarbonate, comprising a first step in which an aromatic dihydroxy compound and monovalent phenol are reacted with carbon monoxide and oxygen to produce a polycarbonate prepolymer and a second step in which the polycarbonate prepolymer is subjected to solid state polymerization to produce polycarbonate, wherein a catalyst for producing polycarbonate comprising a reaction product obtained by reacting (a) catalyst carrier containing nitrogen or phosphorus for fixing palladium and metal having a redox catalytic ability with (b) a palladium compound and (c) a cobalt compound having a redox catalytic ability, (e) an organic redox agent and (f) a dehydrating agent is used in the first step.

15. A catalyst for producing polycarbonate comprising a reaction product obtained by reacting (a) a catalyst carrier selected from a compound obtained by partially quaternizing nitrogen or phosphorus contained in at least one selected from diphenylphosphino-polystyrene, poly-4-vinylpyridine or poly-2-vinylpyridine with alkyl halide for fixing palladium and cobalt with (b) a palladium compound and (c) a cobalt compound, (e) an organic redox agent and (f) a dehydrating agent.

* * * * *